(12) United States Patent
Pranam et al.

(10) Patent No.: US 9,887,990 B2
(45) Date of Patent: Feb. 6, 2018

(54) PROTECTION OF APPLICATION PASSWORDS USING A SECURE PROXY

(71) Applicant: INTERNATIONAL BUSINESS MACHINES CORPORATION, Armonk, NY (US)

(72) Inventors: Codur S. Pranam, Singapore (SG); Vivek Shankar, Singapore (SG)

(73) Assignee: International Business Machines Corporation, Armonk, NY (US)

(*) Notice: Subject to any disclaimer, the term of this patent is extended or adjusted under 35 U.S.C. 154(b) by 94 days.

(21) Appl. No.: 15/137,251

(22) Filed: Apr. 25, 2016

(65) Prior Publication Data

US 2017/0310659 A1    Oct. 26, 2017

(51) Int. Cl.
*H04L 29/06*    (2006.01)

(52) U.S. Cl.
CPC ........ *H04L 63/083* (2013.01); *H04L 63/0815* (2013.01); *H04L 63/102* (2013.01)

(58) Field of Classification Search
CPC .. H04L 63/0815; H04L 63/083; H04L 63/102
See application file for complete search history.

(56) References Cited

U.S. PATENT DOCUMENTS

| | | | |
|---|---|---|---|
| 8,856,905 B2 | 10/2014 | Lundblade | |
| 8,973,111 B2 | 3/2015 | Kuang et al. | |
| 2003/0061512 A1 | 3/2003 | Flurry et al. | |
| 2004/0123144 A1* | 6/2004 | Chan | H04L 63/0281 726/8 |
| 2007/0226783 A1* | 9/2007 | Mimlitsch | H04L 63/0815 726/4 |
| 2015/0304292 A1 | 10/2015 | Dulkin et al. | |
| 2015/0365412 A1 | 12/2015 | Innes et al. | |
| 2016/0234209 A1 | 8/2016 | Kahol et al. | |

FOREIGN PATENT DOCUMENTS

CN    1905446 A    1/2007

OTHER PUBLICATIONS

IBM, "Single Sign on—A Contrarian View," IBM developerWorks, Aug. 14, 2001, http://www.ibm.com/developerworks/websphere/library/techarticles/0108_botzum/botzum.html, pp. 1-8.

(Continued)

*Primary Examiner* — Dao Ho
(74) *Attorney, Agent, or Firm* — David Zwick

(57) ABSTRACT

A computer-implemented method, computer program product, and system for tagging and replacing tagged credentials with target credentials unknown to a client. The method includes; receiving an access request from a client to access a protected resource on a target server, injecting credential field tags into a credential form used to access the protected resource, auto-submitting the credential form on the client computer, replace tagged credentials with target credentials, submitting the target credentials to the target server, and updating the target credentials if the target credentials are invalid or expired without intervention by the client.

14 Claims, 5 Drawing Sheets

(56) References Cited

OTHER PUBLICATIONS

Cyberark, "Application Credential Security," http://www.cyberark.com/solutions/by-project/application-credential-security/, Copyright © 2015 CyberArk Software, Ltd., Printed on Dec. 29, 2015, pp. 1-4.
Mell et al., "The NIST Definition of Cloud Computing", National Institute of Standards and Technology, Special Publication 800-145, Sep. 2011, pp. 1-7.
IBM, List of IBM Patents or Patent Applications Treated as Related, Appendix P, dated Jul. 26, 2017, 2 pages.
Pending U.S. Appl. No. 15/658,673, filed Jul. 25, 2017, entitled: "Protection of Application Passwords Using a Secure Proxy".

* cited by examiner

PROTECTION OF APPLICATION PASSWORDS USING A SECURE PROXY

BACKGROUND

The present invention relates generally to the field of user authentication, and more particularly to proxy-based authentication management.

Authentication in computer systems can be done in various ways and involves acquiring user or application characteristics or credentials and verifying them against a known value. In popular conventional authentication implementations, a user, which can be a person or an application, requesting a connection to a target will interact with a client (machine) which then provides client credentials to the target. Typically, the target is a server machine or server process providing a service to the client. Typically, direct connection is made to the target via a protocol. The target (or server) can be implemented either in hardware or by software. Upon receiving the client credentials, the target will authenticate the provided client credentials by comparing them with known values in order to verify the client and accordingly authorize (grant or deny) the request for connection. In this conventional authentication process, security breaches can occur at the client, at the target, and in the transfer of client credentials between the client and the target (during communications).

SUMMARY

Embodiments of the present invention disclose a computer-implemented method, computer program product, and system for tagging and replacing tagged credentials with target credentials unknown to a client including; receiving an access request from a client to access a protected resource on a target server, injecting credential field tags into a credential form used to access the protected resource, auto-submitting the credential form on the client computer, replace tagged credentials with target credentials, submitting the target credentials to the target server, and updating the target credentials if the target credentials are invalid or expired without intervention by the client.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
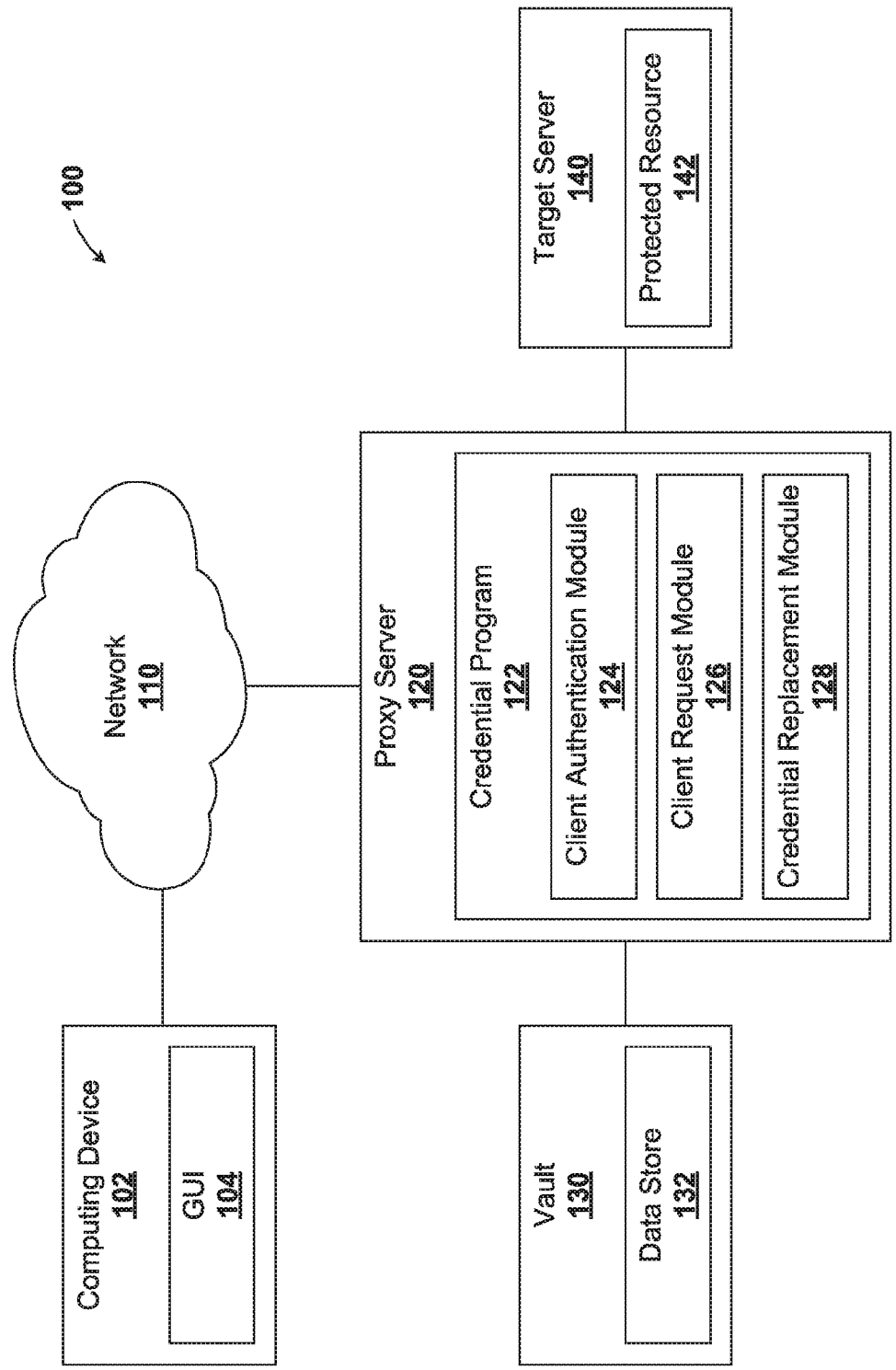
FIG. 1 is a functional block diagram illustrating a proxy server authentication environment, according to an exemplary embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention relates generally to the field of user authentication, and more particularly to proxy-based authentication management. Typically, a proxy server acts as an intermediary between a client (i.e., a user) and a protected resource. A proxy server commonly performs tasks such as user authentication where a client requests access to a protected resource stored on a target server, the proxy forwards the request to the target server which then returns credential field requirements for access to the protected resource. For example, a user may send a request for access to a protected resource via a computing device where the proxy server intercepts the request and returns a response including, for example, required credential fields as if the response came directly from a target server. Typically, a proxy server acts as an intermediary between a user and a protected resource, however, the protection provided by the proxy server may be limited during certain credential events (e.g., password generation or password change) due to users recycling common passwords across a plurality of applications.

According to one embodiment, the risks of a user created password may be avoided by using a set of client credentials for user authentication (e.g., into an enterprise account) and a set of target credentials linked to the user (but unknown to the user) for access a protected resource. It may be advantageous to use credential field tags to map required credential fields to user target credentials, where the target credential tags are injected into each credential field required to access a protected resource. The proxy server can then replace the required credential fields with the target credentials upon credential submission from the client. Additionally, if the target credentials are expired (e.g., expired password) the proxy server can change the target credentials (without user intervention) and store the updated target credentials for future use.

As used in this description and the accompanying claims, the following terms shall have the meanings indicated, unless the context otherwise requires.

The term 'authentication' or 'authenticating' in the context of this document generally refers to the process of verifying the identity of a person or application. This process can include receiving credentials of the person or application, comparing them with known values, and accordingly verifying (successfully or unsuccessfully) the identity of the person or application.

The term 'authorization' or 'authorizing' in the context of this document generally refers to the process of granting or denying access or a level of access to a target system to a person or application that has been authenticated.

The term 'client credentials' in the context of this document generally refers to credentials possessed by the client which can be used to verify that a client is who the client claims to be. Client credentials can be used in authentication with another element or module of a system, for example authentication to a proxy or an enterprise account.

The term 'target credentials' or 'proxy-target credentials' in the context of this document generally refers to credentials for authentication to a target. Target credentials can be passed to the target by another element or module of a system, for example by a proxy server.

The term 'credentials', when used in general in this document, can refer to any credentials in the system, including client credentials and target credentials.

In the context of this document, the term 'user' or is generally used to refer to a human who is interacting with a client computer, but can also refer to an application on the client computer, to a computer or device connected to the client computer (such as mobile or network device), and to a computer or device, such as a piece of hardware (where the hardware is acting as the user). One skilled in the art will realize from the context of the description in this document that the term "user" may also refer to an application on a client.

In the context of this document, the term 'client', 'client computer', or 'client machine' generally refers to the machine, device, or module used by a user (human, application, or machine). For example, an application (user) can reside on a client machine. Actions performed by a user are typically performed on the client (client machine). As will be obvious to one skilled in the art, the use of the general term 'client' refers to a portion of the system including the client machine and/or an associated user, user actions, and/or client processes. The term 'client' when used in connection with actions or processes of the system can refer to user actions and/or client machine processes.

The term 'proxy' in the context of this document generally refers to a machine, module, application, or system that acts as an intermediary for requests between clients and target(s).

The term 'target' or 'target server' in the context of this document generally refers to a machine, module, application, or system that provides service to a client. Typically, a client desires connection with a target, and the client initiates connection requests between the client and the target.

The term 'protected resource" in the context of this document generally refers to a resource (an application, an object, a document, a page, a file, executable code, or other computational resource, communication-type resource, etc.) for which access is controlled or restricted. A protected resource is identified by a Uniform Resource Locator (URL), or more generally, a Uniform Resource Identifier (URI), that can only be accessed by an authenticated and authorized user.

FIG. 1 is a functional block diagram of a proxy server authentication environment 100, according to one or more embodiments of the present invention. More specifically, proxy server authentication environment 100 includes computing device 102, proxy server 120, vault 130, and target server 140 connected via network 110. It should be appreciated that illustrated figures provide only an illustration of one implementation and does not imply any limitations with regard to the environments in which different embodiments may be implemented. Many modifications to the depicted environments may be made based on design and implementation requirements.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between computing device 102, proxy server 120, and/or target server 140, in accordance with one or more embodiments of the invention.

Target server 140 may be a mainframe server computer system such as a management server, a web server, or a computing device such as a laptop computer, tablet computer, netbook computer, personal computer (PC), a desktop computer, a personal digital assistant (PDA), a smartphone, a SMS capable phone, or any programmable electronic device capable of communicating with proxy server 120, computing device 102, and vault 130 via network 110, in accordance with one or more embodiments of the invention. Target server 140 can represent a "cloud" of computers interconnected by one or more networks, where the respective servers are a primary server for a computing system utilizing clustered computers when accessed through network 110. Target server 140 can include a protected resource 142 such as, for example, Facebook®.

Computing device 102 may be laptop computers, tablet computers, netbook computers, personal computers (PC), desktop computers, personal digital assistants (PDA), smartphones, SMS capable phones, or any programmable electronic device capable of communicating with proxy server 120 via network 110, in accordance with one or more embodiments of the invention. In an embodiment, computing device 102 may be a client computer having a graphical user interface (GUI) 104 allowing a user to log into an enterprise account and/or for requesting access to protected resource 142 via network 110. An access request sent by the client may be intercepted by proxy server 120 for further processing as will be discussed below.

Proxy server 120 may be a mainframe server computer system such as a management server, a web server, or a computing device such as a laptop computer, tablet computer, netbook computer, personal computer (PC), a desktop computer, a personal digital assistant (PDA), a smartphone, a SMS capable phone, or any programmable electronic device capable of communicating with target server 140, computing device 102, and vault 130 via network 110, in accordance with one or more embodiments of the invention. Proxy server 120 can also represent a "cloud" of computers interconnected by one or more networks, where the respective servers are a primary server for a computing system utilizing clustered computers when accessed through network 110.

In an embodiment, proxy server 120 acts as an intermediary between a client-side and a server-side authentication infrastructure, where proxy server 120 can operate in conjunction with one or more authentication servers. For example, a user may be authenticated into a client-side infrastructure using enterprise account credentials and may be authenticated into a server-side infrastructure using target credentials (unknown to the user), where the target credentials are required to access protected resource 142. The terms "server-side" and "client-side" refer to actions or entities at a server or a client, respectively, within proxy server authentication environment 100.

Proxy server 120 includes credential program 122, which is a collection of machine readable instructions and data that is used to receive, authenticate, tag, and replace credential fields required to access protected resource 142, according to one or more embodiments of the present invention. Credential program 122 includes a plurality of modules such as client authentication module 124 (for authenticating a user), client request module 126 (for receiving and tagging client requests for access to a protected resource), and credential replacement module 128 (for replacing tagged credential fields with target credentials).

Client authentication module 124 is a collection of machine readable instructions and data that is used to authenticate a user into a client-side infrastructure (e.g., into an enterprise account), according to one or more embodiments of the present invention. The user can be authenticated using any authentication techniques known in the art such as, for example, by authenticating the user into an enterprise account using privileged account credentials or root account credentials. Alternatively, the user may be authenticated after proxy server 120 receives an access request to access protected resource 142. User authentication can be initiated by the user or automatically when proxy server 120 receives the access request. If the user is not authenticated at the time of receiving the access request, client authentication module 124 can require the user to perform an authentication process by sending the client some type of authentication challenge (e.g., a client-side credential requirement). The authentication challenge may be in various formats, such as an HTML form. The user then provides the requested or required information, such as a user identifier and an associated password, or the client may automatically return certain information. The user authentication or authentication challenge may support forms-based single-sign-on operations in accordance with an embodiment of the present invention.

An active session can be initiated upon authorization of the user, such that proxy server 140 can maintain information regarding a secure client-side session for the authorized user during the active session. Accordingly, information may be available for retrieval by proxy server 120 on behalf of the user during an active session. When proxy server 120 or some other server requires any other authentication information or the intervention of another authentication processes, it may be assumed that such resources are available to proxy server 120 through an appropriate authentication infrastructure. After the user is authenticated, an access request can be process by client request module 126.

Client request module 126 is a collection of machine readable instructions and data that is used to process access requests, according to one or more embodiments of the present invention. The process is initiated when the user request a server-side protected resource (e.g., protected resource 142), such as a web page within the domain "ibm.com". The user can send the access request via a web browser (or associated application or applet) via GUI 104, such that an HTTP request is sent to target server 140 (hosting protected resource 142) and which is intercepted by proxy server 120 and forwarded to target server 140. Client request module 126 receives an access response from target server 140 regarding the forwarded access request, for example, a credential form having required credential fields for access to protected resource 142. Client request module 126 can identify the protocol of target server 140, for example, Hypertext Transfer Protocol (HTTP), remote desktop protocol (RDP), or secure shell (SSH) protocol using techniques known in the art. After client request module 126 identifies the required credential fields in the access response, tagged credentials and credential field tags are injected into each required credential field on the credential form. The credential field tags may be, for example, a client-side script (e.g., JavaScript). If the required credential fields include a username and password, a tag_username and tag_password may be injected into each credential field, respectively. Client request module 126 then sends the tagged credential form to the client (e.g., computing device 102). The tagging scripts can automate elements of GUI 104 on the client application (browser, desktop applications, etc.). The scripts can also be used for auto-submittal of the credential form by GUI 104 without user intervention. Once the credential form is submitted, credential replacement module 128 can replace the required credential fields with target credentials.

Credential replacement module 128 is a collection of machine readable instructions and data that is used to identify required target credential fields tagged by client request module 126 and replacing the required credential fields with target credentials. After the proxy server 120 receives the credential form submitted with tagged credentials and credential field tags, credential replacement module 128 searches data store 123 for target credentials mapped to the authenticated user via the credential field tags. If there are no target credentials stored in data store 128, credential replacement module 128 may generate target credentials for the authenticated user. If target credentials are found in data store 128, credential replacement module 128 may replace the tagged credentials and credential field tags with the target credentials and submit the replaced credential form to target server 140 for access to protected resource 142. If the target credentials are valid, the user is given access to protected resource 142, if the target credentials require additional steps (e.g., credential fields need to be updated or changed), the required changes are done by credential replacement module 128 and the updated target credentials are stored in data store 132. The updated target credentials are then used to allow the authenticated user to gain access to protected resource 142.

Figure 2:
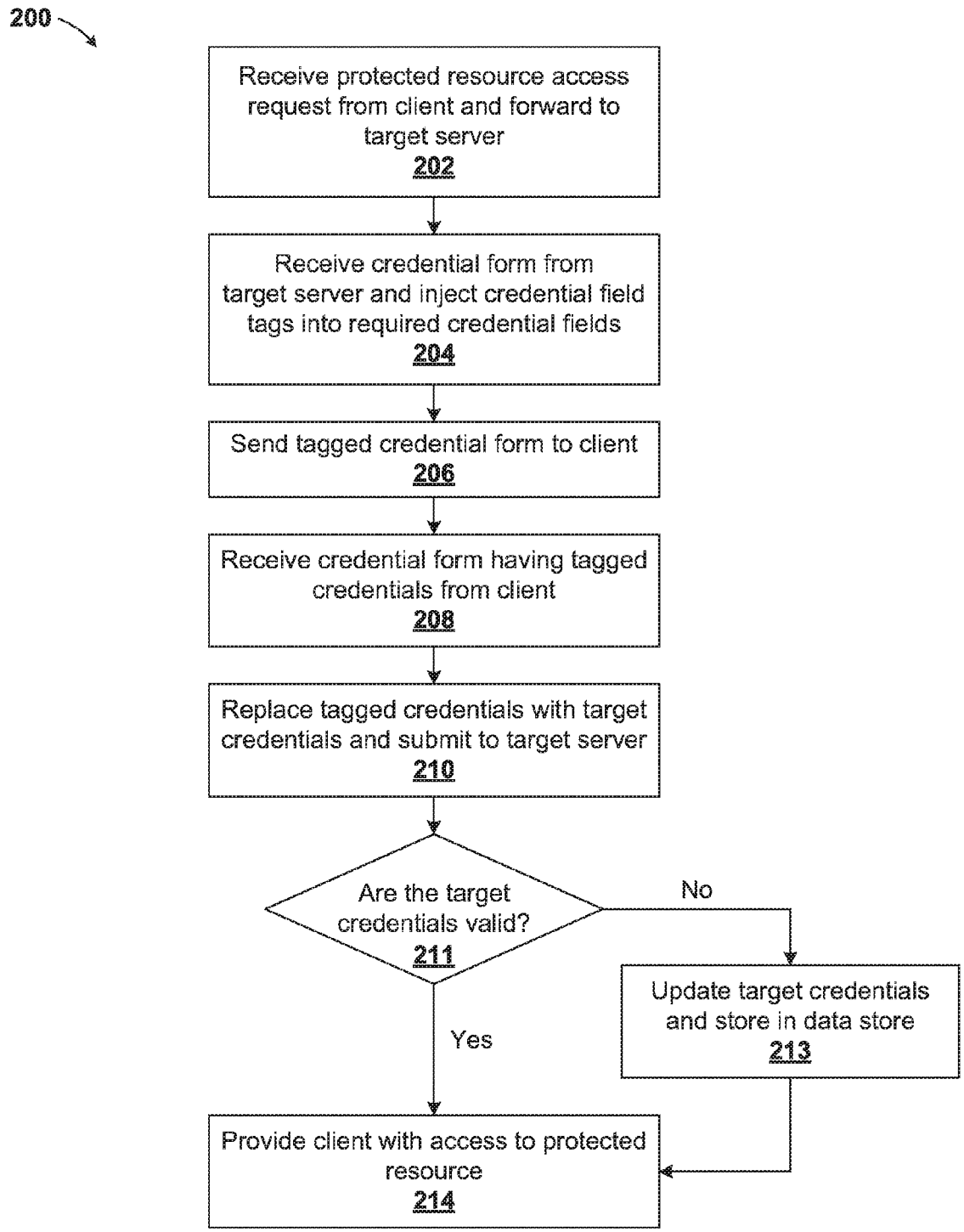
FIG. 2 is credential replacement flowchart depicting the operational steps of a credential replacement program, according to an exemplary embodiment.

FIG. 2 is a credential replacement flowchart 200 depicting operational steps of credential replacement program 122, according to one or more embodiments of the present invention. A user (or client machine) is authenticated into, for example, an enterprise account using techniques discussed above. Credential replacement program 122 receives a request originating from the authenticated user to access protected resource 142 and forwards the access request to target server 140 (Step 202). Credential replacement program 122 receives a credential form from target server 140 and injects credential field tags into each required credential field of the credential form (Step 204). Credential replacement program 122 sends the tagged credential form to client computer, (Step 206). Credential replacement program 122 receives credential form with tagged credentials from client computer (Step 208) and replaces the tagged credentials with target credentials (Step 210). Credential replacement program 122 determines if the target credentials are valid by submitting the replaced credentials in the credential form to target server (Step 211). If the target credentials are valid, the user is given access to the protected resource (Step 214), if the target credentials need to be modified, credential replacement program 122 modifies the target credentials and updates the target credentials in the data store (Step 213) and allows the user to access the protected resource (Step 214).

Figure 3:
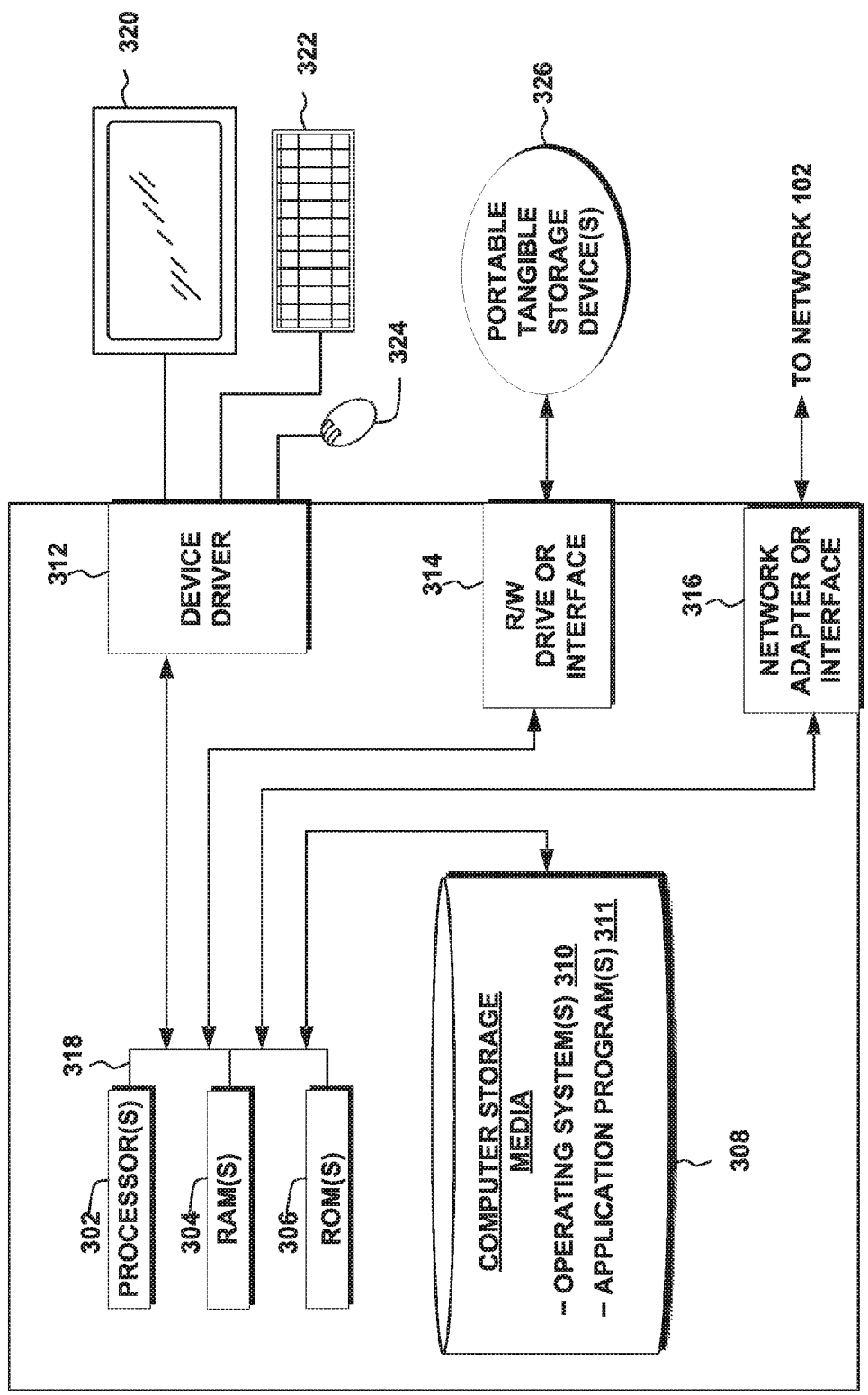
FIG. 3 is a block diagram of components of a server or computing device executing the credential replacement program, according to an exemplary embodiment.

FIG. 3 is a block diagram of components of proxy server 120 in accordance with one or more embodiments of the present invention. It should be noted, the components presented may be similar to components of computing device 102 or target server 140.

Proxy server 120 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, credential program 122, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Proxy server 120 may also include a R/W drive or interface 314 to read from and write to one or more portable computer readable storage media 326. Application programs 311 on proxy server 120 may be stored on one or more of the portable computer readable storage media 326, read via the respective R/W drive or interface 314 and loaded into the respective computer readable storage media 308.

Proxy server 120 may also include a network adapter or interface 316, such as a TCP/IP adapter card or wireless communication adapter (such as a 4G wireless communication adapter using OFDMA technology). Application programs 311 on proxy server 120 may be downloaded from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Proxy server 120 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
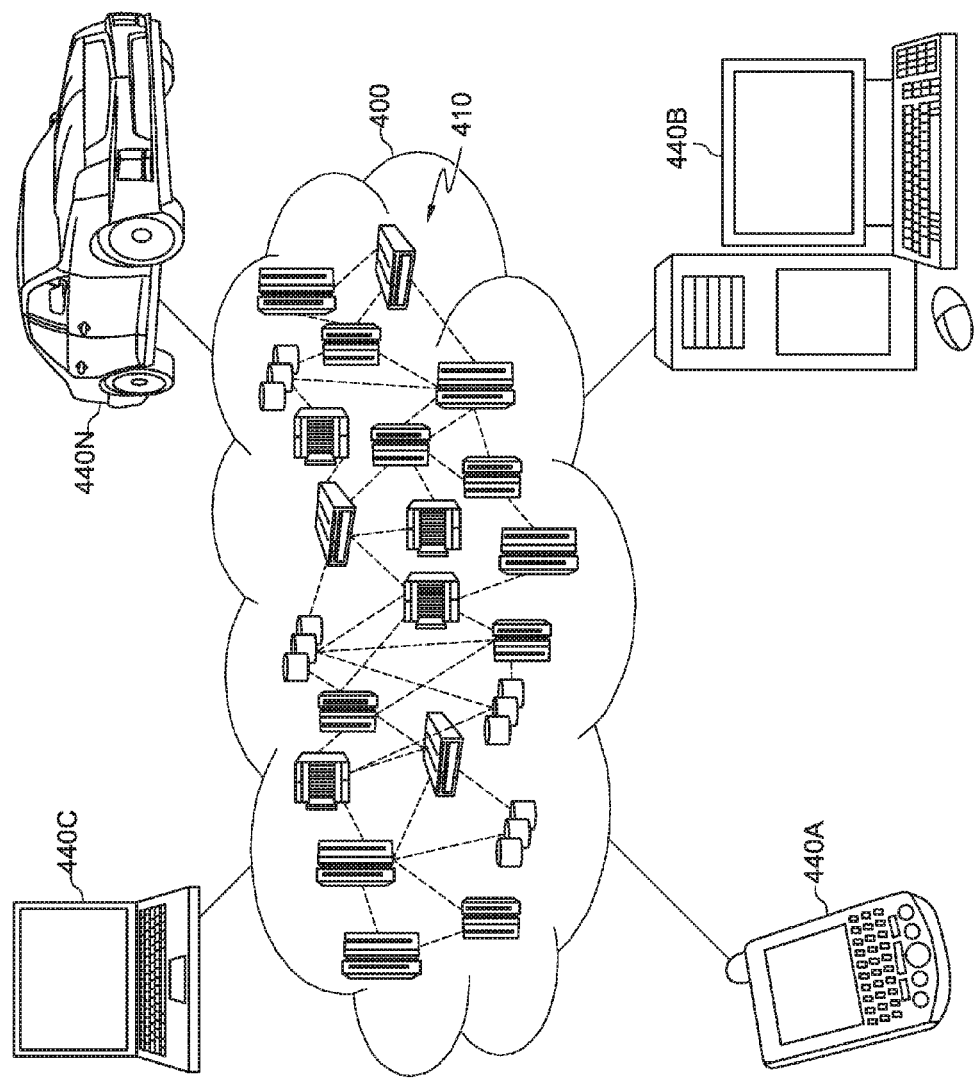
FIG. 4 depicts a cloud computing environment, according to an exemplary embodiment.

FIG. 4 is an exemplary illustration of a cloud computing environment, according to one or more embodiments of the present invention. The cloud computing environment can include one or more cloud computing nodes with which local computing devices used by cloud consumers, such as, for example, personal digital assistant (PDA) or cellular telephone 440A, desktop computer 440B, and/or laptop computer 440C may communicate. The nodes may be grouped (not shown) physically or virtually, in one or more networks, such as Private, Community, Public, or Hybrid clouds as described hereinabove, or a combination thereof. This allows the cloud computing environment to offer infrastructure, platforms and/or software as services for which a cloud consumer does not need to maintain resources on a local computing device. It is understood that the types of computing devices 440A-C are intended to be illustrative only and that computing nodes and the cloud computing environment can communicate with any type of computerized device over any type of network and/or network addressable connection (e.g., using a web browser).

Figure 5:
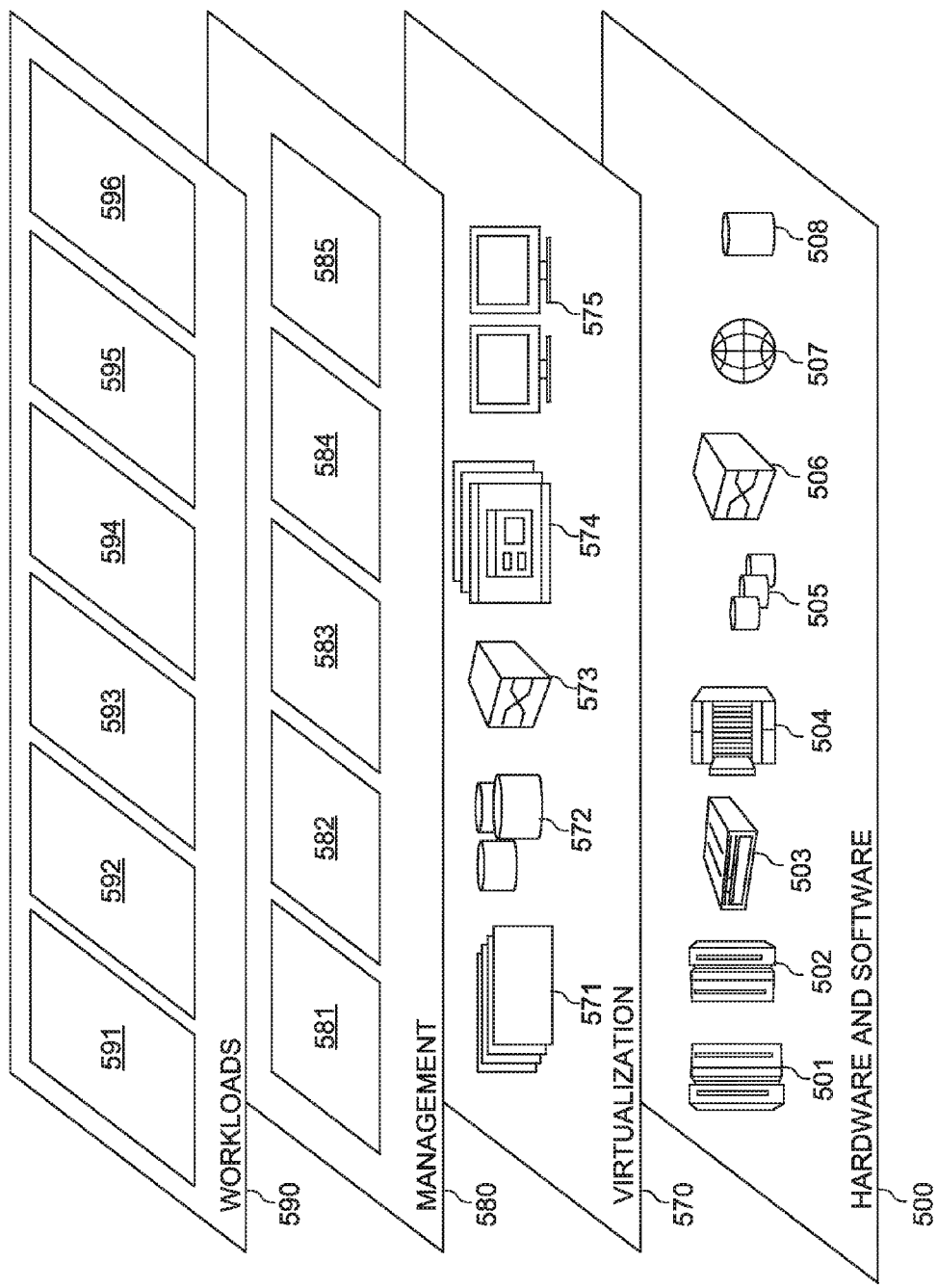
FIG. 5 depicts abstract model layers of a cloud computing environment, according to an exemplary embodiment.

FIG. 5 is a set of functional abstraction layers provided by the cloud computing environment illustrated in FIG. 4, according to one or more embodiments of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 500 includes hardware and software components. Examples of hardware components include: mainframes 501; RISC (Reduced Instruction Set Computer) architecture based servers 502; servers 503; blade servers 504; storage devices 505; and networks and networking components 506. In some embodiments, software components include network application server software 507 and database software 508.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and credential replacement processing 596.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more processors, an access request from a client computer for access to a protected resource stored on a target server;
forwarding, by the one or more processors, the access request to the target server;
receiving, by the one or more processors, an access response from the target server, wherein the access response is a credential form including credential fields required to access the protected resource;
injecting, by the one or more processors, a credential field tag into each required credential field;
sending, by the one or more processors, the tagged credential form to the client computer;
receiving, by the one or more processors, a tagged credential form from the client computer including tagged credentials in the required credential fields with the credential field tags, wherein the tagged credentials are auto-submitted by the client computer;

replacing, by the one or more processors, the tagged credentials with target credentials mapped by the credential field tags, wherein the target credentials are stored in a protected data store;

sending, by the one or more processors, the target credentials to the target server;

updating, by the one or more processors, the target credentials and storing the updated target credentials in a protected data store without client intervention;

determining, by the one or more processors, the target credentials are invalid;

replacing, by the one or more processors, the invalid target credentials with the updated target credentials and submitting the updated target credentials to the target server, in response to the target credentials being invalid; and allowing, by the one or more processors, the client computer to access the protected resource, in response to the target server validating the target credentials.

2. The method of claim 1, wherein the user is authenticated into an enterprise account using client credentials.

3. The method of claim 1, further comprising:
entering, by the one or more processors, the tagged credentials into the credential form having credential field tags.

4. The method of claim 1, wherein the target credentials are generated by the one or more processors.

5. The method of claim 1, wherein the credential field tags are in the form of JavaScript.

6. A computer program product comprising:
one or more non-transitory computer-readable storage media and program instructions stored on the one or more non-transitory computer-readable storage media, the program instructions comprising:
program instructions to receive, by the one or more processors, an access request from a client computer for access to a protected resource stored on a target server;
program instructions to forward, by the one or more processors, the access request to the target server;
program instructions to receive, by the one or more processors, an access response from the target server, wherein the access response is a credential form including credential fields required to access the protected resource;
program instructions to inject, by the one or more processors, a credential field tag into each required credential field;
program instructions to send, the one or more processors, the tagged credential form to the client computer;
program instructions to receive, by the one or more processors, a tagged credential form from the client computer including tagged credentials in the required credential fields with the credential field tags, wherein the tagged credentials are auto-submitted by the client computer;
program instructions to replace, by the one or more processors, the tagged credentials with target credentials mapped by the credential field tags, wherein the target credentials are stored in a protected data store;
program instructions to send, by the one or more processors, the target credentials to the target server;
program instructions to update, by the one or more processors, the target credentials and storing the updated target credentials in a protected data store without client intervention;
program instructions to determine, by the one or more processors, the target credentials are invalid;
program instructions to replace, by the one or more processors, the invalid target credentials with the updated target credentials and to submit the updated target credentials to the target server, in response to the target credentials being invalid; and
program instructions to allow, by the one or more processors, the client computer to access the protected resource, in response to the target server validating the target credentials.

7. The computer program product of claim 6, wherein the user is authenticated into an enterprise account using client credentials.

8. The computer program product of claim 6, further comprising:
program instructions to enter, by the one or more processors, the tagged credentials into the credential form having credential field tags.

9. The computer program product of claim 6, wherein the target credentials are generated by the one or more processors.

10. The computer program product of claim 6, wherein the credential field tags are in the form of JavaScript.

11. A computer system comprising:
one or more computer processors;
one or more computer-readable storage media; and
program instructions stored on the computer-readable storage media for execution by at least one of the one or more computer processors, the program instructions comprising:
program instructions to receive, by the one or more processors, an access request from a client computer for access to a protected resource stored on a target server;
program instructions to forward, by the one or more processors, the access request to the target server;
program instructions to receive, by the one or more processors, an access response from the target server, wherein the access response is a credential form including credential fields required to access the protected resource;
program instructions to inject, by the one or more processors, a credential field tag into each required credential field;
program instructions to send, the one or more processors, the tagged credential form to the client computer;
program instructions to receive, by the one or more processors, a tagged credential form from the client computer including tagged credentials in the required credential fields with the credential field tags, wherein the tagged credentials are auto-submitted by the client computer;
program instructions to replace, by the one or more processors, the tagged credentials with target credentials mapped by the credential field tags, wherein the target credentials are stored in a protected data store;
program instructions to send, by the one or more processors, the target credentials to the target server;
program instructions to update, by the one or more processors, the target credentials and storing the updated target credentials in a protected data store without client intervention;

program instructions to determine, by the one or more processors, the target credentials are invalid;

program instructions to replace, by the one or more processors, the invalid target credentials with the updated target credentials and to submit the updated target credentials to the target server, in response to the target credentials being invalid; and program instructions to allow, by the one or more processors, the client computer to access the protected resource, in response to the target server validating the target credentials.

12. The computer system of claim 11, wherein the user is authenticated into an enterprise account using client credentials.

13. The computer system of claim 11, further comprising: program instructions to enter, by the one or more processors, the tagged credentials into the credential form having credential field tags.

14. The computer system of claim 11, wherein the target credentials are generated by the one or more processors.

* * * * *